Patented Nov. 21, 1944

2,363,473

UNITED STATES PATENT OFFICE 2,363,473

MEASURING AND CONTROLLING SYSTEM

John D. Ryder, Pepper Pike Village, Ohio, assignor to Bailey Meter Company, a corporation of Delaware Application March 3, 1941, Serial No. 381,535

5 Claims. (Cl. 171—95)

This invention relates to electrical measuring and controlling systems, and particularly to such a system useful in measuring and visually advising the value of a variable, such as rate of flow, pressure, temperature, electromotive force, conductivity, the position of a member, etc. In fact it is useful in the measuring of any quantity, value, position or variable.

In accordance with my invention variations in the magnitude of the quantity or variable, or variations in a position, are represented by an electromotive force or change in electromotive force, and then the value or change in value of the E. M. F. is measured by a new and novel voltmeter arrangement and circuit.

Any position, variable, quantity or value which may be represented by an E. M. F. or whose change or variation may be represented by an E. M. F. may be measured by my invention. In general, I provide a continuously balanced slide back electronic voltmeter. In particular, any relatively small voltage to be measured is applied to an electron discharge device or vacuum tube voltmeter which controls a motor control circuit whereby a reversible electric motor is positioned in proper direction to bring the circuit to a balanced condition and at the same time to move an indicator or recording pen.

For an understanding of my invention and for illustration of some of the forms it may take, reference may be had to the following description and to the drawings in which.

Figure 1:
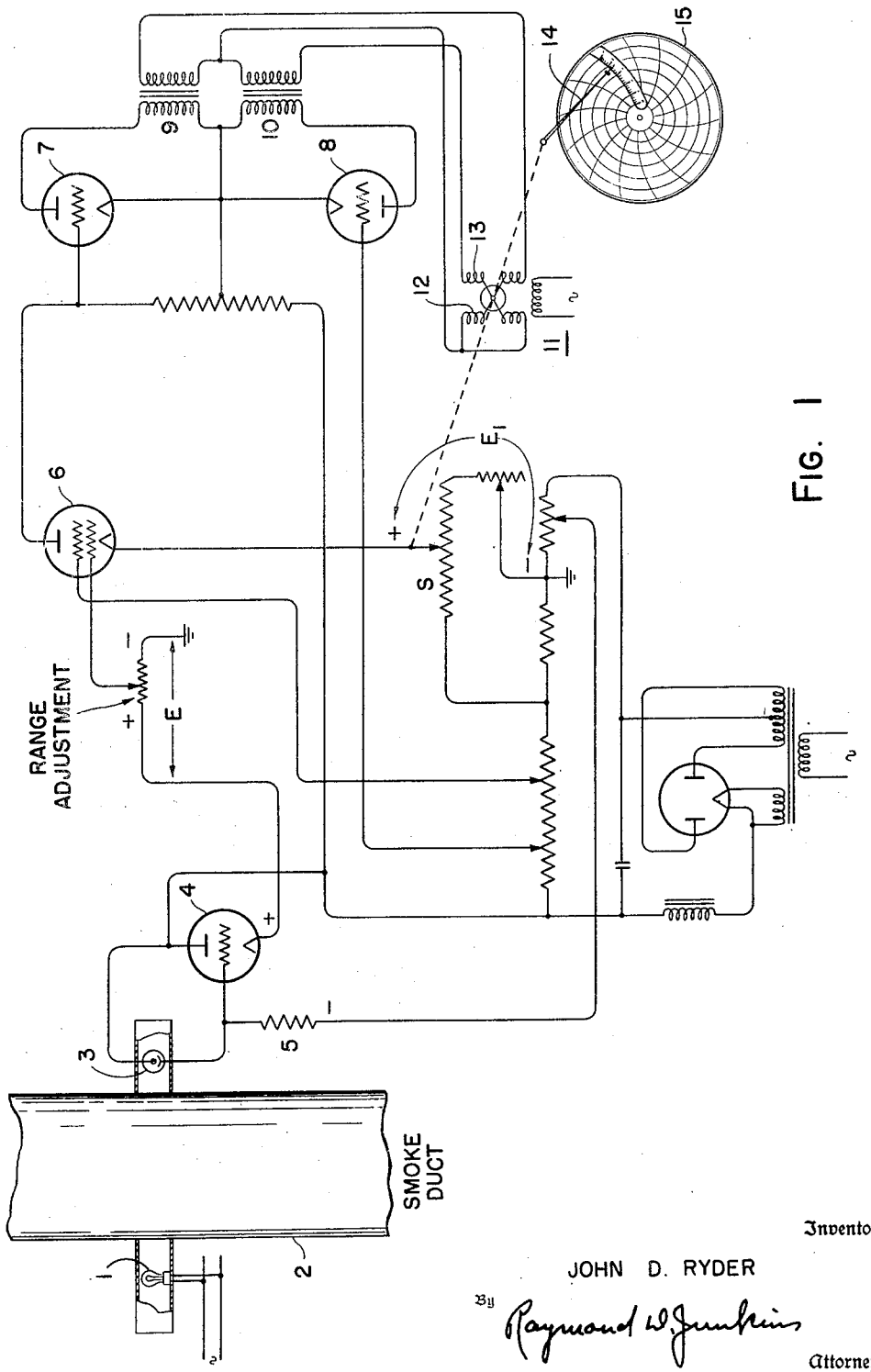
Fig. 1 is a diagrammatic representation of a preferred embodiment of my invention, and particularly incorporated in a smoke density recorder for fuel fired furnaces.

Referring now particularly to Fig. 1, I illustrate means for establishing a voltage representative of the density of the smoke passing through a duct or flue from a fuel-fired furnace. It is to be understood that the measurement scale may be arbitrarily chosen to be from zero smoke (no hindrance to light transmission) to complete absence of light transmission, or any arbitrary portion of such range. I have illustrated in Fig. 1 a smoke density recorder, but the arrangement is such that it may be readily applied to any use wherein it is desired to ascertain light transmission between a light source and a light sensitive element such as a phototube. For example, the arrangement of Fig. 1 might quite satisfactorily be applied to the counting of packages moving along a conveyor belt where a light beam normally passes across the belt from the light source to a phototube and where the packages intermittently interrupt the beam. In such an arrangement variations in voltage resulting from variations in current through the photocell may be utilized to indicate, record or totalize the number of packages passing the light beam on the conveyor. The particular usage illustrated in Fig. 1, namely, as a smoke density recorder, is a specific application chosen merely for the purpose of explanation and is not to be considered as limiting.

In Fig. 1 a light source 1 is located adjacent a smoke passage or duct 2. Aligned with the light source, on the opposite side of the duct, is a phototube 3 of known type. If there is no smoke or other impedance to the passage of light, then a current flow of maximum value is established through the phototube 3, while varying degrees of impedance caused by varying smoke density intercepting the light beam results in corresponding variations in current passage through the phototube 3. The detector element includes an electron discharge device 4 in whose grid or input circuit is connected the phototube 3 and in whose output circuit is connected a fixed resistance 5. Variations in current flow through the phototube 3 control the grid of the device 4 and result in a corresponding voltage drop across the resistance 5.

The voltage in the output circuit of the device 4 is applied to and measured by a voltage responsive electronic device 6 which controls a pair of electron discharge devices 7, 8. The voltage responsive electronic device 6 normally has a current flowing through it such that the impulses to the two motor control tubes 7, 8 are just balanced. The devices 7 and 8 in turn are connected to transformers 9, 10 which control a reversible induction motor 11. The secondary of the transformer 9 is connected in the output circuit of the discharge device 7 while the secondary of the transformer 10 is connected in the output circuit of the device 8.

When the devices 7 and 8 are non-conducting, the impedance of the primaries of the transformers 9, 10 is sufficient that the opposed shaded pole windings 12, 13 are substantially open circuited and the motor 11 is not urged to rotation. With the device 7 conducting the impedance of the primary of the transformer 9 is reduced sufficiently so that the winding 12 is substantially short circuited and the motor 11 rotates in desired direction. Conversely when the device 8 is conducting, the winding 13 is substantially short circuited and the motor 11 rotates in opposite direction.

Certain features of the motor control circuits, disclosed but not claimed herein, are disclosed and claimed in my prior Patent 2,215,254.

In general, the phototube 3 receives light through the smoke column and applies a voltage proportional thereto to the vacuum tube 4. This voltage varies the current through the tube 4 and accordingly the voltage drop E across the resistor marked "Range adjustment."

Voltage E is accordingly in proportion to the light received through the smoke and which is to be recorded.

In the recorder the voltage responsive electronic device 6 normally passes such a current that the impulses to the motor control tubes 7, 8 are just balanced and the motor 11 is at rest. The current is determined by the voltage applied to the grid of the voltage responsive electronic device 6. If anything changes this current value, then the motor control tubes 7, 8 will cause the motor 11 to run in one direction for an increase in current and in the reverse direction for a decrease in current.

The voltage E, proportional to the smoke density, is connected to oppose a voltage $E_1$ selected from the slide wire S and proportional to the desired chart reading. That is, E subtracts from $E_1$ and the difference in voltage is applied to the grid of the tube 6 where it controls the current flowing. This difference in voltage may be either positive or negative, depending on whether E or $E_1$ is larger. If positive then the current through 6 increases, causing rotation of the motor in such a direction as to move the slide wire to increase the value of $E_1$. If the difference in voltage is negative then the current through 6 is decreased, causing rotation of the motor in reverse direction, reducing the value of the voltage $E_1$. The result is that voltage $E_1$ is automatically adjusted by the motor control circuits and motor so that $E_1$ is made to equal E. If E changes due to a change in smoke density, the motor runs and adjusts $E_1$ to equal E at all times thereby making the position of the slider on the slide wire S a measure of the smoke density.

This in gentral provides the circuit which I term a continuously balanced slide-back electronic voltmeter. The motor 11 not only positions the contact along the slide wire S, but at the same time it is adapted to move an indicating-recording pen 14 relative to a time driven chart 15 for visually indicating the position of the slider on the slide wire S representative of the voltage E or making a permanent record thereof. As previously mentioned, the value of the voltage E is representative of smoke density, or broadly of whatever variable, value or position it is desired to measure and which has been initially represented by a voltage E which is then measured.

The entire arrangement provides a continuously balanced slide-back electronic voltmeter instantly responsive to variations in a voltage to be measured, for control of a reversible motor which performs the balancing function and at the same time positions an indicator or recording pen for visual indication of the value of the voltage and for permanent recording of the value relative to time. The voltage may be either direct current or alternating current.

Figure 2:
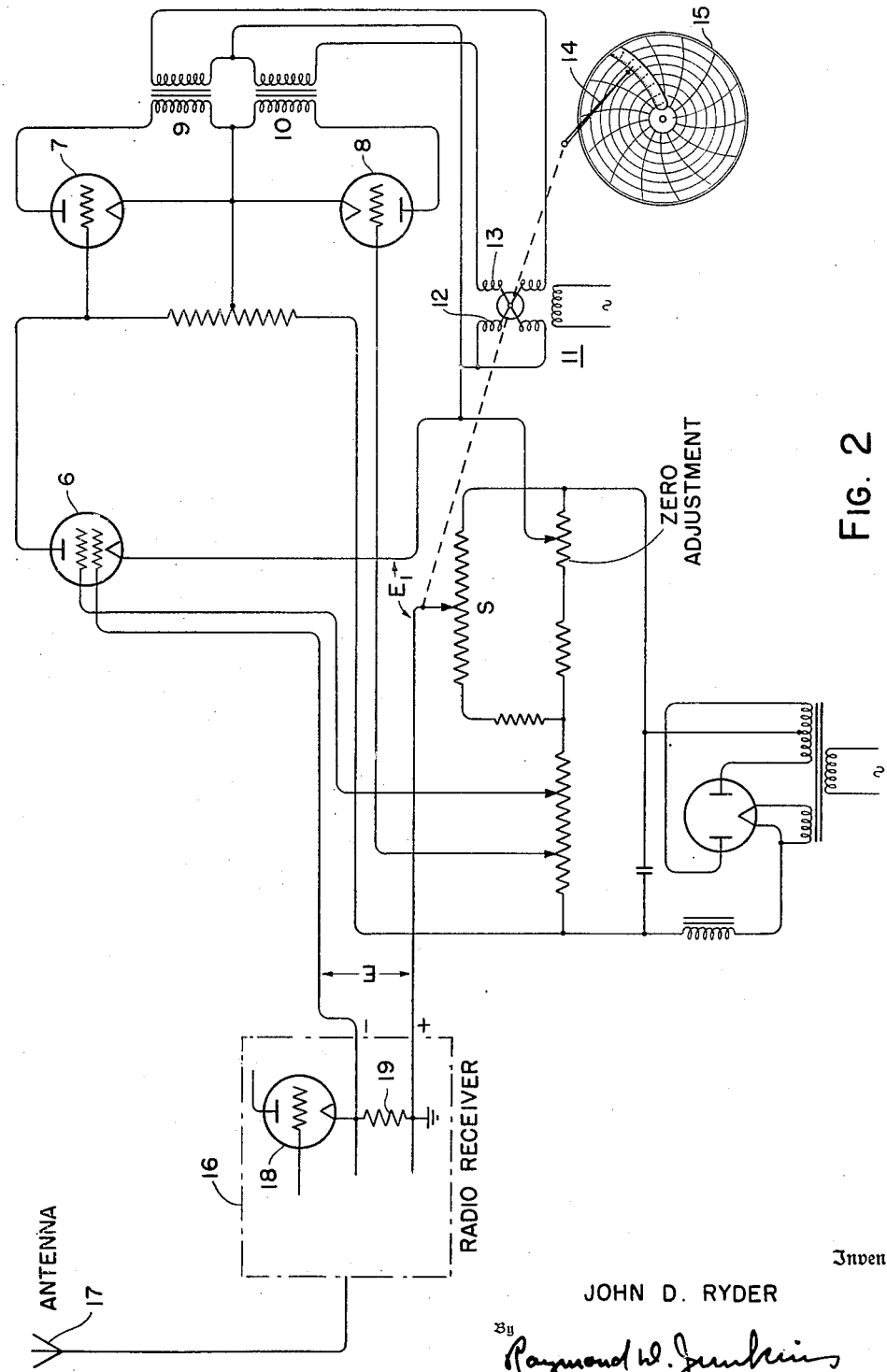
Fig. 2 illustrates diagrammatically a further embodiment of my invention, and particularly in connection with the measurement of signal strength in a radio receiver.

In Fig. 2 I illustrate a further embodiment of my invention quite similar to the embodiment of Fig. 1 except for minor changes necessary because of the polarity of the voltage to be measured. Herein I show a measurement of signal strength or other voltage from a radio receiver 16 having a selected electronic device 18 in whose output circuit is connected a resistance 19 across which a voltage E is to be measured. This voltage may be in the nature of 5 to 15 volts and the circuit and apparatus previously described constitutes a self-balancing slide-back electronic voltmeter for measuring the voltage E and continuously balancing the measuring circuit.

The voltage E may be taken from any one of several selected locations in a standard radio receiver, either representative of voltage drop across the resistance 19 or of A. V. C. voltage as desired. The receiver 16 may be provided with an antenna 17 and the radio receiver may take any of many forms or stages of amplification and detection. The measurement of A. V. C. voltage or signal strength has a high commercial utility in different locations adjacent or remote a transmitting station for analyzing transmission of signals or of television. Such analysis is highly desirable both in the design of such stations, their rearrangement or redesign, and in studying the effect of weather conditions, etc., on broadcast signals or programs.

It is also contemplated that the device 16, producing a voltage to be measured, may be susceptible to static in an antenna system where the static is deliberately measured or indicated as representative of an electrical fault or disturbance. Furthermore, the device 16 need not be a radio receiver of the type or for the purpose of receiving broadcast signals or programs, but may be connected to an antenna located adjacent electrical apparatus, such as bus bars, transmission systems, transformers, etc., and arranged only for picking up incipient faults, leakages or discharges, converting them into representative voltages and then measuring the voltages to distinguish between those faults or leakages which may be of inconsequential value and those which are incipient or leading toward complete breakdown. Such fault detection or anticipation provides knowledge as to possible breakdown a considerable length of time prior to the breakdown, and which information is of course valuable in preventing breakdown.

In general, the arrangement of Fig. 2 is intended to measure voltages and voltage changes from such apparatus as is generally termed radio type receiving apparatus and where a knowledge of voltage or voltage change is commercially useful either to anticipate or detect faults or leakages or for the purpose of measuring signal strength and/or A. V. C. voltages.

Figure 3:
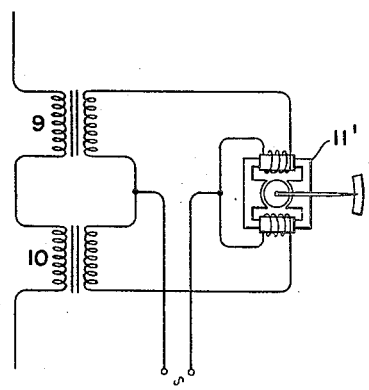
Fig. 3 illustrates the application of another type of reversible electric motor to the arrangements of Figs. 1 and 2.

In Fig. 3 I illustrate the transformers 9, 10 controlling the rotation and direction of rotation of a motor 11' which is a reversible induction motor but of different type than that shown at 11 in Figs. 1 and 2. The motor of Fig. 3 is illustrative of an opposed wound field motor urged to rotation in one direction or the other if only one of the two fields is energized. If both of the fields are energized or if both of the fields are deenergized, the motor is not urged to rotation. The showing of Fig. 3 is similar to that of Figs. 1 and 2 except that a source of alternating current must be supplied to the opposed fields whereas with the wound shading pole type of motor illustrated in Figs. 1 and 2 the alternating current in the wound shading pole circuit is induced from the energized field of the motor 11. While in function the transformers 9 and 10 of Fig. 3 are identical with those of Figs. 1 and 2 they are however selected or designed to take care of the particular voltages, etc. necessary for the motor 11' as compared to the motor 11.

Figure 4:
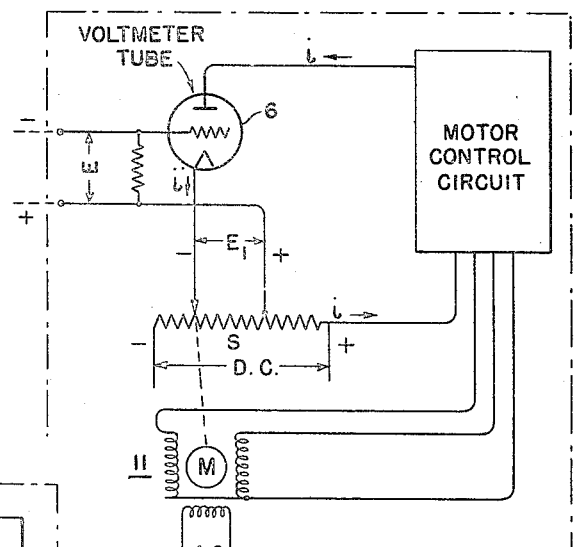
Figs. 4 and 5 illustrate simplified wiring diagrams showing different applications of the complete circuit of Figs. 1 and 2.
Figure 5:
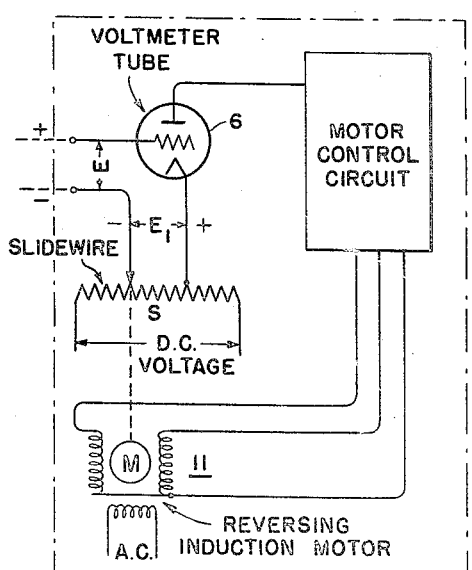

In Figs. 4 and 5 I illustrate very schematically the basic arrangement previously described and wherein the device 6 is sensitive to unbalance between voltages E and E₁ for control, through the motor control circuit, of the motor 11 in one direction or the other. Movement of the motor rebalances the circuit through the slide-back resistance S and the showing constitutes the continuously balanced slide-back electronic voltmeter. The distinction between Figs. 4 and 5 is that of the polarity of the voltage applied or which is to be measured. Otherwise the circuits are the same. These figures are representative of the basic arrangement applicable to the measurement of any direct current voltage which is to be measured.

While I have illustrated and described certain preferred arrangements of my continuously balanced slide-back electronic voltmeter, it is to be understood that these are representative only and that I am not necessarily to be limited thereto.

Certain features of my invention, disclosed but not claimed herein, are disclosed and claimed in the copending application of John D. Ryder and Anthony J. Hornfeck, Serial No. 381,534, filed of even date herewith, now Patent 2,343,116, dated February 29, 1944.

What I claim as new and desire to secure by Letters Patent of the United States is:

1. An electrical measuring system for indicating changes in electromotive-force including in combination, an electron discharge device having an input circuit arranged for conductive connection to the voltage to be measured and forming a portion of an automatically rebalancing system comprising a source of voltage and a shunting potentiometer including a slide wire resistance arranged in said system and adapted for balancing the voltage to be measured through the said device, a reversible motor under the control of the output of said device, said motor being arranged to adjust the said slide wire resistance upon change in voltage to balance the voltage to be measured and stop the motor, and an indicator positioned by the motor to designate the value of said electromotive force.

2. A measuring system including in combination, means continuously establishing an electrical voltage representative of the state of a variable, a voltage responsive electronic device having an input circuit with which said voltage is associated, said device having an output the value of which is determined by the amplitude of the input, a pair of electron discharge devices each having an input and an output circuit, an induction motor having forward and reverse windings, said output of the voltage responsive electronic device being connected to control the input of one of said pair of discharge devices, the output circuits of said discharge devices being associated respectively with the two motor windings, a source of potential and a slide wire device connected to adjust the said potential to oppose the input to said electronic device, means connecting the motor to regulate the slide wire device to balance the system, and an index adjusted by said motor to designate the initial voltage mentioned.

3. An electrical measuring circuit for indicating changes in an electromotive force comprising a local input circuit including a thermionic device having an established anode-cathode voltage value and subject to the influence of the variable E. M. F. to change the current in the anode-cathode circuit, an output circuit including a fixed impedance and a voltage responsive electronic device so associated that variations in voltage value in the impedance resulting from said input variations produce a concomitant change in the output circuit of the electronic device, means to associate the output change with one of a pair of electron discharge devices, reversible motor means controlled by the output circuits of said pair of electron discharge devices, a source of voltage and a slide wire having a contact positioned by said motor means to correspond to the value of said input circuit, said voltage and slide wire being connected to the output of said electron device for balancing the effect of said impedance circuit, and an indicator positioned with said slide wire and indicative of the voltage value of the said local input circuit.

4. An electrical measuring circuit for indicating changes in an electromotive force comprising a local input circuit including a thermionic device having an established anode-cathode voltage value and a control electrode subject to the influence of said variable E. M. F. to change the current in the anode-cathode circuit, an output circuit including an impedance and a voltage responsive electronic device so associated that variations in voltage value in the impedance resulting from said input variations produce a concomitant change in the output of the electronic device, a pair of electron discharge devices one of which is associated for control by the output change, reversible motor means controlled by the output circuits of said pair of electron discharge devices, a source of potential and a slide wire potentiometer having a contact adjustable by said motor means to regulate said potential to correspond to the value of said input circuit, said slide wire potential being connected to the output of said electron device for balancing the effect of the voltage in said impedance circuit, and an indicator positioned with said slide wire and indicative of the voltage of the local input circuit.

5. An electrical measuring circuit for indicating changes in an electromotive force comprising a local input circuit including a thermionic device having an established anode-cathode voltage value and a control electrode subject to the influence of said variable E. M. F. to change the current in the anode-cathode circuit, an output circuit including a series connected impedance, a source of constant voltage so connected as to oppose that developed in the said impedance, means to initially adjust said voltage so that the variable E. M. F. ranges above and below the same, a voltage responsive electronic device connected between said impedance and said voltage source and so associated with said impedance that said ranges resulting from input variations produce a concomitant change in the output of the electronic device, a pair of electron discharge devices one of which is associated for control by the said output, reversible motor means controlled by the output of said pair of electron discharge devices, a slide wire connected in shunt to said voltage source and adjustable by said motor means for balancing the voltage in said impedance circuit, and an indicator positioned with said slide wire and indicative of the voltage of the measured E. M. F.

JOHN D. RYDER.